US012467070B2

(12) United States Patent
Donzelli et al.

(10) Patent No.: US 12,467,070 B2
(45) Date of Patent: Nov. 11, 2025

(54) SEMISYNTHETIC PROCESS FOR THE PREPARATION OF COLCHICINE

(71) Applicant: Indena S.P.A., Milan (IT)

(72) Inventors: Fabio Donzelli, Milan (IT); Pietro Allegrini, Milan (IT); Alessandro Andreani, Milan (IT); Andrea Gambini, Milan (IT); Davide Berlanda, Milan (IT)

(73) Assignee: Indena S.P.A., Milan (IT)

( * ) Notice: Subject to any disclaimer, the term of this patent is extended or adjusted under 35 U.S.C. 154(b) by 377 days.

(21) Appl. No.: 18/001,741

(22) PCT Filed: Jun. 14, 2021

(86) PCT No.: PCT/IB2021/055213
§ 371 (c)(1),
(2) Date: Dec. 14, 2022

(87) PCT Pub. No.: WO2021/255618
PCT Pub. Date: Dec. 23, 2021

(65) Prior Publication Data
US 2023/0227873 A1    Jul. 20, 2023

(30) Foreign Application Priority Data
Jun. 16, 2020    (IT) .................. 102020000014362

(51) Int. Cl.
*C12P 15/00*    (2006.01)
*C07C 233/32*    (2006.01)
*C12N 9/24*    (2006.01)

(52) U.S. Cl.
CPC ............ *C12P 15/00* (2013.01); *C07C 233/32* (2013.01); *C12N 9/2402* (2013.01); *C12Y 302/01021* (2013.01)

(58) Field of Classification Search
CPC .......... C12P 15/00; C12P 13/02; C12P 19/56; C12P 7/02; C07C 233/32; C12N 9/2402; C12Y 302/01021; C12Y 302/01004; C12Y 302/01091; A61P 19/06; A61P 29/00
See application file for complete search history.

(56) References Cited

U.S. PATENT DOCUMENTS 7,683,163 B2 *   3/2010   Bombardelli ........... A61P 29/00
                                                            536/17.9

FOREIGN PATENT DOCUMENTS

EP    2784161 A1    10/2014
GB    762706 A      12/1956

OTHER PUBLICATIONS

Barleben et al., Molecular architecture of Strictosidine Glucosidase: The gateway to biosynthesis of the monoterpenoid indole alkaloid family. The Plant cell, 2007, vol. 19: 2886-2897. (Year: 2007).*
Broun et al., Catalytic plasticity of fatty acid modification enzymes underlying chemical diversity of plant lipids. Science, 1998, vol. 282: 1315-1317. (Year: 1998).*
Devos et al., Practical limits of function prediction. Proteins: Structure, Function, and Genetics. 2000, vol. 41: 98-107. (Year: 2000).*
Gelmi et al., 3-Demetoxy-3-glycosylaminothiocolchicine: synthesis of a new class of putative muscle relaxant compounds. J. Med. Chem., 2006, vol. 49: 5571-5577. (Year: 2006).*
Novozymes Product information,Cellualse/Cellic CTec2; 9 pages, downloaded on Apr. 15, 2025. (Year: 2025).*
Novozymes Product information, Cellulase/Cellic CTec3; 5 pages downloaded on Apr. 15, 2025. (Year: 2025).*
Schmidt et al., Identification of a *Saccharomyces cerevisiae* glucosidase that hydrolyzes flavonoid glucosides. Appl. Environ. Microbiol., 2011, vol. 77(5): 1751-1757. (Year: 2011).*
Seffernick et al., Melamine deaminase and Atrazine chlorohydrolase: 98 percent identical but functionally different. J. Bacteriol., 2001, vol. 183 (8): 2405-2410. (Year: 2001).*
Whisstock et al., Prediction of protein function from protein sequence. Q. Rev. Biophysics., 2003, vol. 36 (3): 307-340. (Year: 2023).*
Witkowski et al., Conversion of b-ketoacyl synthase to a Malonyl Decarboxylase by replacement of the active cysteine with glutamine. Biochemistry, 1999, vol. 38: 11643-11650. (Year: 1999).*
Graening T. et al., "Total syntheses of colchicine in comparison: a journey through 50 years of synthetic organic chemistry", Angewandte Chemie International Edition, vol. 43, No. 25, Jun. 21, 2004, pp. 3230-3256.
Rodrigues A.C. et al., "Celluclast and Cellic CTec2: saccharification/ fermentation of wheat straw, solid-liquid partition and potential of enzyme recycling by alkaline wash", Enzyme and Microbial Technology, Stoneham, MA, US, vol. 79, Jul. 17, 2015, pp. 70-77.
Rosner M. et al., "Biological effects of modified colchicines. Improved preparation of 2-Demet hylcolchicine, 3-Demethylcolchicine, and (+)-Colchicine and reassignment of the position of the double bond in dehydro-7-deacetamidocolchicines", J. Med. Chem. J. Biochem. Pharmacol. Biochemistry. Fed. Proc., Fed. Am. Soc. Exp. Biol. J. Biol. Chem., Jan. 1, 1981, pp. 257-261.
Search Report and Written Opinion of PCT/IB2021/055213 of Oct. 15, 2021.
Yoshida K et al., "Colchicoside in Colchicum autumnale Bulbs", Agricultural and Biological Chemistry, vol. 52, No. 2, Feb. 1, 1988, pp. 593-594.

* cited by examiner

*Primary Examiner* — Ganapathirama Raghu
(74) *Attorney, Agent, or Firm* — Silvia Salvadori, P.C.; Silvia Salvadori

(57) ABSTRACT

The invention relates to a process for the preparation of colchicine 1 from colchicoside 2 which comprises enzymatic conversion of colchicoside 2 to 3-O-demethylcolchicine 3, wherein the enzyme used is a cellulase. According to another aspect of the invention, 3-O-demethylcolchicine 3 can be converted to colchicine 1 using an alkylating agent. The invention also relates to a process for enriching the colchicine 1 content of extracts from plants belonging to the Colchicaceae family containing colchicine 1, colchicoside 2 and 3-O-demethylcolchicine 3, which comprises conversion by means of a colchicoside 2 cellulase to 3-O-demethylcolchicine 3, followed by conversion of 3-O-demethylcolchicine 3 to colchicine 1 using an alkylating agent.

12 Claims, No Drawings

SEMISYNTHETIC PROCESS FOR THE PREPARATION OF COLCHICINE

This application is a U.S. national stage of PCT/IB 2021/055213 filed on 14 Jun. 2021, which claims priority to and the benefit Italian Patent Application No. 102020000014362 filed on 16 Jun. 2020, the contents of which are all incorporated herein by reference in their entireties.

BACKGROUND TO THE INVENTION

Colchicine N-[(7S)-5,6,7,9-tetrahydro-1,2,3,10-tetramethoxy-9-oxobenzo[a]heptalen-7-yl]-acetamide, having formula 1, is a tricyclic alkaloid present in plants belonging to the Colchicaceae family such as *Colchicum*, *Gloriosa*, *Iphigenia*, *Littonia*, *Merendera* and *Sandersonia*.

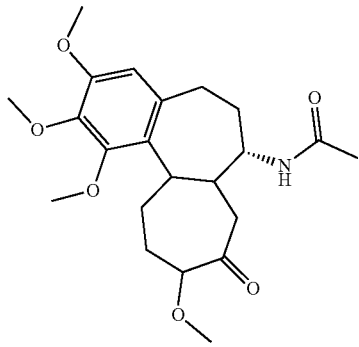

FIG. 1- colchicine 1

It is mainly extracted from *Gloriosa superba* seeds, which also contain the colchinoid congeners colchicoside N-[(7S)-3-(β-D-glucopyranosiloxy)-5,6,7,9-tetrahydro-1,2,10-trimethoxy-9-oxobenzo[a]heptalen-7-yl]-acetamide, having structure 2, and 3-O-demethylcolchicine, N-[(7S)-5,6,7,9-tetrahydro-3-hydroxy-1,2,10-trimethoxy-9-oxobenzo[a]heptalen-7-yl]-acetamide, having formula 3, which are present in the ratio of about 1:1 and 0.5:1 to colchicine 1 respectively (Capistrano R. et al., Phytomedicine 2016, 23(12), 1434).

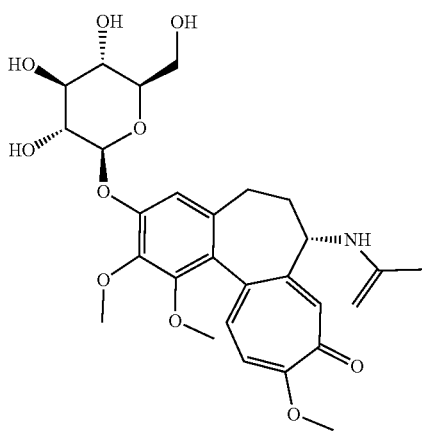

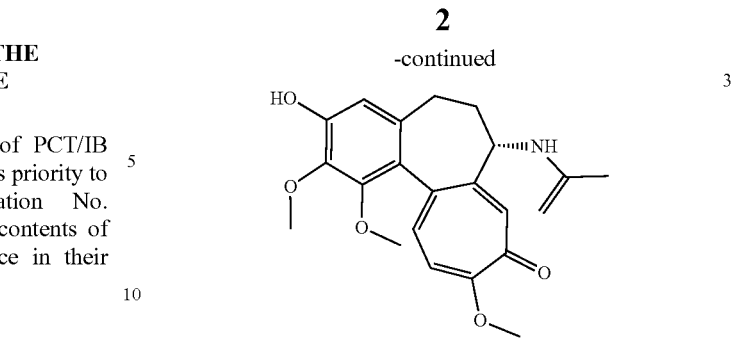

FIGS. 2 and 3- colchicoside 2 and 3-O-demethylcolchicine 3

Colchicine is useful in the treatment of various disorders, such as gout and Mediterranean fever, for which it is the main approved and marketed active ingredient, Behçet's syndrome, and autoimmune disorders or those affecting the cardiocirculatory system.

Recently, in conjunction with the spread of coronavirus SARS-CoV-2, the interest of the scientific community has focused (inter alia) on colchicine 1; according to ongoing epidemiological studies, after a first incubation stage ranging from 1-14 days, SARS-CoV-2 infection is characterised by the onset of a hyperactive inflammatory state, due to uncontrolled release of pro-inflammatory cytokines. Said inflammatory/immune reaction can damage the tissues and, in the most serious cases, can be fatal. The hypothesis regarding the use of colchicine 1 for the treatment of Covid-19-positive patients is based on the anti-inflammatory properties of the medicament, which have already proved effective in the treatment of Mediterranean fever and pericarditis (Vitelio et al., Cytokine storm and colchicine potential role fighting SARS-CoV-2 pneumonia, Italian Journal of Medicine 2020).

In view of its many clinical applications, there is still a pressing need to develop methodologies able to increase production of colchicine 1, for example by converting compounds that are usually coextracted, such as colchicoside 2 and 3 demethylcolchicine 3, to colchicine 1.

Although the prior art contains no examples of direct conversion of colchicoside 2 to colchicine 1, examples of conversion of colchicoside 2 to 3-O-demethylcolchicine 3 and separately, methods for methylation of 3-O-demethylcolchicine 3 analogues, can be identified.

One option for conversion of colchicoside 2 to 3-O-demethylcolchicine 3 is represented by an acid-catalysed hydrolysis process involving the use of an 85-86% phosphoric acid solution, as described in U.S. Pat. No. 5,175,342. Although said process enables 3-O-demethylcolchicine 3 to be obtained with a fairly good yield, it is not advantageous, as it is potentially in competition with hydrolysis of the amide group present in the 7 position.

A possible alternative solution is represented by an enzymatic hydrolysis process; for example, 3-O-demethylcolchicine 3 can be obtained by treating colchicoside 2 with β-glucosidase (Yoshida K. et al., Agric. Biol. Chem. 1988, 52(2) 595). The drawback of said process is that the enzyme used is highly purified, and therefore not usable for industrial-scale applications. Moreover, examination of the data reported by the authors shows that the amount of enzyme used is much higher (20-50 times) than that of the substrate. Nevertheless, the authors still report long reaction times; in fact, it takes seven days to complete the conversion of colchicoside 2 to 3-O-demethylcolchicine 3.

As regards the methylation reaction that would enable 3-O-demethylcolchicine 3 to be converted to colchicine 1, alkylating agents such as diazomethane (DE 957,123), methyl iodide and dimethylsulphate have been described (Graening T. et al., Angew. Chem. Int. Ed. 2004, 43,3230).

The use of said reagents, which are highly toxic, involves significant drawbacks: for example, diazomethane is a highly unstable compound that can readily catch fire and/or generate explosions; the use of methyl iodide produces iodinated by-products requiring expensive disposal procedures; and the use of dimethylsulphate requires specific units for the management of gaseous reagents.

There is consequently a clear need to develop further processes for the conversion of colchicoside 2 and 3-O-demethylcolchicine 3 to colchicine 1.

DESCRIPTION OF THE INVENTION

The Applicant has developed a semisynthetic process for the preparation of colchicine 1 from colchicoside 2 which comprises cellulase-catalysed enzymatic conversion of colchicoside 2 to 3-O-demethylcolchicine 3. Cellulases are a family of enzymes able to catalyse hydrolysis of 1,4-β-D-glycoside bonds in cellulose and lichenin, and of β-D-glucans in cereals; said enzymes are produced by a wide range of micro-organisms (aerobic, anaerobic, mesophilic and thermophilic) such as those belonging to the genera *Clostridium*, *Cellulomonas*, *Thermomonospora*, *Trichoderma* and *Aspergillus*. The industrial use of said unpurified enzymes, which is widespread and well-established, mainly takes place in the paper, textile and food industries and in the production of biofuels (Kuhad et al., Enzyme Research 2011, ID 280696).

For the purposes of the present invention, the term "cellulases" means a family comprising β-glucosidase (EC 3.2.1.21), endo-(1,4)-β-D-glucanase (EC 3.2.1.4) and/or exo-(1,4)-β-D-glucanase (EC 3.2.1.91). The term "cellulases" preferably means mixtures of at least two or more enzymes, including at least one of β-glucosidase (EC 3.2.1.21), endo-(1,4)-β-D-glucanase (EC 3.2.1.4) and exo-(1,4)-β-D-glucanase (EC 3.2.1.91), the mixtures whereof possess β-glucosidase activity greater than or equal to 15 U/g, preferably greater than 30 U/g, and more preferably greater than 120 U/g. To clarify, in the present invention, "β-glucosidase activity" means the ability of an enzyme, or a mixture of enzymes, to promote the p-nitrophenylglucoside hydrolysis reaction. To clarify further, in the present invention the term "β-glucosidase" refers to almond β-glucosidase.

The cellulases useful for the purposes of the present invention are preferably enzymes which, at temperatures ranging between 35 and 60° C. and at a pH ranging between 3 and 7, in amounts ranging between 0.05 and 0.5 g per g of cellulose substrate, hydrolyse at least 80% of the substrate to monomers in a period of three days; even more preferably, the cellulases useful for the purposes of the present invention are enzymes which, at temperatures ranging between 45 and 50° C. and at pH 5, used in the amount of 0.08 g per g of cellulose substrate, hydrolyse 80% of the substrate to monomers in a period of three days.

Thus in a first aspect thereof, the invention relates to a process for the preparation of colchicine 1 from colchicoside 2 which comprises enzymatic conversion of colchicoside 2 to 3-O-demethylcolchicine 3, wherein the enzyme used is a cellulase. It has in fact been surprisingly observed that 3-O-demethylcolchicine 3 can be obtained from colchicoside 2 by using said process.

The process of the invention has proved particularly advantageous as it enables colchicoside 2 to be converted to 3-O-demethylcolchicine 3 using significantly lower amounts of enzyme than those reported by Yoshida K. et al., as shown in Table 1:

TABLE 1

| Enzyme | Enzyme/substrate ratio | β-glucosidase activity [U/g] | Conversion of colchicoside 2 to 3-O-demethyl-colchicine 3 after 24 h | Conversion of colchicoside 2 to 3-O-demethyl-colchicine 3 after 48 h |
|---|---|---|---|---|
| β-Glucosidase | 18-54/1 | 12200 ± 192 | 75% | 90% |
| Cellulase (CELLULOSIN ® T3) | 0.5/1 | 123 ± 5 | 85% | 96% |
| Cellulase (CELLIC ® CTEC2) | 0.05/1 | 4080 ± 140 | 91% | 99% |

On the basis of the respective conversion kinetics, it has surprisingly been observed that in the first case, the percentage conversion after 24 hours increases by 10 percentage points, whereas in the second case, the percentage conversion after 24 hours increases by 16 percentage points. The increase in percentage conversion using the enzymes listed above represents a further unexpected effect; in fact, a skilled person would expect greater enzyme activity for β-glucosidase, a purified enzyme, than for cellulases, which are unpurified enzymes. Said effect is even more unexpected in view of the β-glucosidase activity values of cellulase, tested according to the procedure reported in Example 4 of the Experimental Section, amounting to 123±5 U/g and 4080±140 U/g for Cellulosin T3 and Cellic CTec2 respectively, compared with the β-glucosidase activity value of β-glucosidase, amounting to 12200±192 U/g.

The unexpectedly greater efficacy of cellulases compared with β-glucosidase in the hydrolysis reaction of colchicoside 2 is confirmed by the experimental tests whose results are set out in Example 3 of the Experimental Section.

The resulting 3-O-demethylcolchicine 3 can be converted to colchicine 1 using known methods and alkylating agents, including methyl iodide, dimethylsulphate or a methylsulphonate.

For the purposes of the present description, the term "methylsulphonate" identifies a compound of general formula 4:

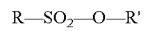

wherein R represents straight or branched alkyl, wherein one or more hydrogens can be substituted with halogen, or aryl, optionally substituted with one or more straight or branched alkyl groups wherein one or more hydrogens can be substituted with halogen and R' represents methyl.

The alkylating agent used is preferably a methylsulphonate 4 wherein R is selected from:

methyl, ethyl or straight or branched $C_3$-$C_{10}$ alkyl, wherein one or more hydrogens can be substituted with halogen;

phenyl, optionally substituted with one or more methyl, ethyl methyl or straight or branched $C_3$-$C_{10}$ alkyl groups, optionally substituted with one or more straight or branched alkyl groups wherein one or more hydrogens can be substituted with halogen.

More preferably, the alkylating agent is selected from methyl mesylate, methyl tosylate, methyl triflate, methyl nosylate and methylbenzenesulphonate; even more preferably, methyl mesylate is used as alkylating agent. The use of methyl mesylate as alkylating agent is particularly advantageous in terms of both costs and safety; in fact, methyl mesylate can be generated in situ using methanol and mesyl chloride, which are inexpensive reagents. Generation in situ cuts the cost of transport and storage of reagents which, if used on an industrial scale, can affect the price of the finished product. Moreover, methyl mesylate is less toxic and more easily manageable than other alkylating agents.

Thus in a second aspect thereof, the invention relates to a process for the preparation of colchicine 1 from colchicoside 2 which comprises enzymatic conversion of colchicoside 2 to 3-O-demethylcolchicine 3, wherein the enzyme used is a cellulase, followed by conversion of 3-O-demethylcolchicine 3 to colchicine 1 using an alkylating agent of formula 4 as defined above, preferably methyl mesylate, methyl tosylate, methyl triflate, methyl nosylate or methylbenzenesulphonate, and more preferably methyl mesylate; In a third aspect thereof, the invention relates to a process of conversion of 3-O-demethylcolchicine 3 to colchicine 1 which uses a methylsulphonate of formula 4 as defined above; the alkylating agent used is preferably methyl mesylate, methyl tosylate, methyl triflate, methyl nosylate or methylbenzenesulphonate, and more preferably methyl mesylate.

In a fourth aspect thereof, the invention relates to a process that enriches the colchicine 1 content of extracts of plants belonging to the Colchicaceae family containing colchicine 1, colchicoside 2 and 3-O-demethylcolchicine 3, wherein the semisynthetic process comprises the conversion of colchicoside 2 to 3-O-demethylcolchicine 3, wherein the enzyme used is a cellulase, followed by conversion of 3-O-demethylcolchicine 3, present in the extract and obtained from colchicoside 2, to colchicine 1 using a methylsulphonate of formula 4 as defined above, preferably methyl mesylate, methyl tosylate, methyl triflate, methyl nosylate or methylbenzenesulphonate, and more preferably methyl mesylate.

With special reference to the first aspect of the invention, a preferred embodiment is represented by process 1, which involves the following steps:
 a) adding a buffer solution to colchicoside 2, to provide reaction mixture A;
 b) adding a cellulase to reaction mixture A, to provide reaction mixture B;
 c) heating and stirring reaction mixture B;
 d) isolating 3-O-demethylcolchicine 3 from reaction mixture B;
 e) converting 3-O-demethylcolchicine 3 to colchicine 1.

Typically, the buffer used in step a) is selected from acetate buffer, citrate buffer and phosphate-citrate buffer; preferably citrate buffer.

The cellulase used in step b) can be selected from the cellulases available on the market under the following trademarks: Cellulosin T3 (HBI), Viscozyme L (Novozyme), Celluclast 1.5 L (Novozyme), Cellic CTec2 (Novozyme), Cellic CTec 3 (Novozyme), Cellulase (Creative Enzymes), *Aspergillus niger* Cellulase (Creative Enzymes) and Cellulase 13L (Biocatalysts); Cellic CTec2 (Novozyme) or Cellic CTec 3 (Novozyme) is preferably used.

Typically, in step b) the ratio of cellulase to colchicoside 2 (g enzyme/g colchicoside 2) used ranges between 0.01 and 1; preferably between 0.05 and 0.5 inclusive. Even more preferably, in step b) the ratio of cellulase to colchicoside 2 (g enzyme/g colchicoside 2) used is 0.01, 0.02, 0.04, 0.05, 0.1, 0.2 or 0.5.

As will be seen from the results of the experimental tests reported in Example 3, when β-glucosidase was used in the ratio of 0.01-1 to colchicoside 2, it proved unexpectedly inefficient in promoting hydrolysis of colchicoside 2 to 3-O-demethylcolchicine 3, although its β-glucoside activity is greater than those of all the cellulases tested. A hypothetical explanation of this unexpected phenomenon can be attributed to the heat-stability of β-glucosidase; in fact, although the activity of the enzyme is greatest at about 60° C., at said temperature β-glucosidase is substantially inactivated by over 50%, after only 30 minutes (Terefe N. S. et al., Appl Microbiol Biotechnol. 2013; 97(7):2917-28). Typically, in step c), reaction mixture B is heated to a temperature ranging from 35° C.-60° C.; preferably from 40° C.-55° C.; and more preferably to 45-50° C.

In a further preferred aspect, in step c), mixture B is maintained under stirring for 12-96 hours; preferably 24-72 hours; more preferably for 48-72 hours; and even more preferably for 65 hours.

Preferably, when the cellulase in step b) is selected from Cellic CTec2 (Novozyme) and Cellic CTec 3 (Novozyme) and used in the ratio of 0.01, 0.02, 0.04 or 0.05 to colchicoside 2 (g enzyme/g colchicoside 2), in step c) reaction mixture B is heated to a temperature ranging from 45-50° C. and maintained under stirring for at least 24 hours, preferably for at least 48 hours; when the cellulase in step b) is selected from Cellulase (Creative Enzymes), *Aspergillus niger* Cellulase (Creative Enzymes) and Cellulase 13L (Biocatalysts), and used in the ratio of 0.05, 0.1, 0.2 and 0.5 to colchicoside 2 (g enzyme/g colchicoside 2), in step c) reaction mixture B is heated to a temperature ranging from 45-50° C. and maintained under stirring for at least 24 hours, preferably for at least 48 hours; when the cellulase in step b) is selected from Cellulosin T3 (HBI), Viscozyme L (Novozymes) and Celluclast 1.5 L (Novozyme), and used in the ratio of 0.01-1 to colchicoside 2 (g enzyme/g colchicoside 2), in step c) reaction mixture B is heated to a temperature ranging from 45-50° C. and maintained under stirring for at least 24 hours, preferably for at least 48 hours.

Step d) can be conducted by extracting reaction mixture B with an organic solvent immiscible with water, selected from butanol, methyl acetate, ethyl acetate, chloroform, dichloromethane, 1,2-dichloroethane, diethyl ether, methyl tert-butyl ether and 2-methyltetrahydrofuran, typically dichloromethane, combining the organic phases and then evaporating them, in such a way as to obtain crude 3-O-demethylcolchicine 3; and adding to crude 3-O-demethylcolchicine 3 an organic solvent miscible with water such as methanol, ethanol, propanol, acetonitrile, acetone or dimethylsulphoxide, typically acetone, which causes the precipitation of 3-O-demethylcolchicine 3 in crystalline form.

3-O-demethylcolchicine 3 can be converted to colchicine 1 by carrying out the following steps, after steps a-d) described above:
 f) adding a polar aprotic solvent to 3-O-demethylcolchicine 3, to provide mixture C;
 g) adding a base to reaction mixture C, to provide reaction mixture D;
 h) adding an alkylating agent to reaction mixture D, to provide reaction mixture E;
 i) heating and stirring reaction mixture E;
 j) isolating colchicine 1 from reaction mixture E.

Typically, the polar aprotic solvent used in step f) is selected from tetrahydrofuran, acetone, acetonitrile, dimethylformamide and dimethylsulphoxide; preferably acetonitrile.

Typically, the base added in step g) is selected from NaOH, KOH, LiOH, Ba(OH)$_2$, Ca(OH)$_2$, Mg(OH)$_2$, Na$_2$CO$_3$, K$_2$CO$_3$ and Cs$_2$CO$_3$; preferably K$_2$CO$_3$.

Typically, the amount of base added in step g) ranges between 1 and 5 equivalents with respect to 3-O-demethylcolchicine 3; preferably 2 equivalents.

According to the second and third aspects of the invention, the alkylating agent used in step h) is a methylsulphonate of formula 4 as defined above, preferably methyl mesylate, methyl tosylate, methyl triflate, methyl nosylate or methylbenzenesulphonate, more preferably methyl mesylate. Typically, the amount of alkylating agent added in step h) ranges between 1 and 10 equivalents with respect to 3-O-demethylcolchicine 3; preferably between 1 and 5 equivalents, and more preferably, between 1 and 3 equivalents.

Typically, in step i), reaction mixture E is heated to a temperature ranging between 40° C. and 80° C.; preferably between 50° C. and 70°; and more preferably to 60° C.

Typically, in step i), reaction mixture E is maintained under stirring for 12-24 hours; preferably for 12-18 hours; and even more preferably for 16 hours.

With special reference to the fourth aspect of the invention, in a preferred embodiment, the extract is obtained from a plant belonging to the Colchicaceae family, selected from *Colchicum*, *Gloriosa*, *Iphigenia*, *Littonia*, *Merendera* and *Sandersonia*; preferably *Gloriosa*; and more preferably *Gloriosa superba*.

In a further preferred aspect, the *Gloriosa superba* extract comprises colchicoside 2, 3-O-demethylcolchicine 3 and optionally colchicine 1; in the present invention, the term "extract" indicates a mixture of compounds obtained by a plant material extraction process and/or a mixture of compounds present in the waste disposal stages of a plant material extraction process.

In a further preferred aspect, the colchicine 1 content of a *Gloriosa superba* extract is enriched by applying to the extract a process comprising steps a)-d) and f)-j).

The invention is illustrated in greater detail in the following experimental part.

Experimental Section

Materials and Methods

Methyl mesylate is prepared according to the methodology reported in WO2008/049116 A2, Example 2, paragraph [00313], page 86.

The $^1$H-NMR analyses were conducted with an NMR Bruker 400 MHz instrument; spectra recorded in CDCl$_3$ at the temperature of 30° C.

The β-glucosidase activity is measured with the "β-Glucosidase Activity Assay Kit", catalogue number MAK129, supplied by Sigma-Aldrich®. The kit contains a buffer solution with pH=7 (catalogue number MAK129A), the substrate p-nitrophenylglucoside (catalogue number MAK129B), and a calibrator equivalent to 250 U/L (catalogue number MAK129C).

EXAMPLES

Example 1—Conversion of Colchicoside 2 to Colchicine 1

Conversion of Colchicoside 2 to 3-O-Demethylcolchicine 3 (Steps a-d)

Colchicoside 2 (50 g, 91 mmol) was added to an aqueous citric buffer (500 mL, pH=4.8); after addition of the enzyme Cellulosin T3 (25 g, 0.5 w/w), the reaction mixture was maintained under stirring at 50° C. for 65 hours. The reaction mixture was cooled to 35° C. and extracted with dichloromethane (5×500 mL). The dichloromethane phases, combined and dried under vacuum, produced 33.5 g of 3-O-demethylcolchicine (87 mmol, yield 95%) as a green solid.

$^1$H-NMR (400 MHz, CDCl$_3$): δ 7.65 (br d, 7=2 Hz, 1H), δ 7.56 (s, 1H), δ 7.31 (d, J=10.9 Hz, 1H), δ 6.86 (d, J=10.9 Hz, 1H), δ 6.57 (s, 1H), δ 6.05 (br s, 1H), δ 4.66-4.60 (m, 1H), δ 3.99 (s, 6H), δ 3.63 (s, 3H), δ 2.46-2.50 (m, 1H), δ 2.37-2.26 (m, 2H), δ 1.97 (s, 3H), δ 1.88-1.84 (m, 1H)

Conversion of 3-O-demethylcolchicine 3 to Colchicine 1 (Steps f-j)

3-O-demethylcolchicine 3, obtained in step d), (10 g, 25.9 mmol) and K$_2$CO$_3$ (7 g, 52 mmol, 2 eq.) were added to acetonitrile (120 mL), and the reaction mixture was placed under inert nitrogen atmosphere. After the addition of methyl mesylate in dichloromethane (35 mmol in 7 mL of DCM), the reaction mixture was heated to 60° C. and maintained under stirring for 16 hours. The reaction mixture was cooled to 25° C., diluted with dichloromethane (240 mL), and extracted with 0.5M NaOH (100 mL). The separate organic phases were washed with 30% NaCl (100 mL), treated with Na$_2$SO$_4$ and concentrated until dry. 10 g colchicine 1 (25.2 mmol, yield 97%) was obtained as a yellow solid.

$^1$H-NMR (400 MHz, CDCl$_3$): δ 7.55 (s, 1H), δ 7.33 (d, J=10.9 Hz, 1H), δ 7.19 (br d, J=6 Hz, 1H), δ 6.86 (d, J=10.9 Hz, 1H), δ 6.53 (s, 1H), δ 4.68-4.62 (m, 1H), δ 4.00 (s, 3H), δ 3.94 (s, 3H), δ 3.90 (s, 3H), δ 3.65 (s, 3H), δ 2.55-2.50 (m, 1H), δ 2.66-2.43 (m, 2H), δ 1.98 (s, 3H), δ 1.92-1.85 (m, 1H)

Example 2

Example 1 was repeated using the enzyme Cellic CTec2 in citrate buffer to convert colchicoside 2 to 3-O-demethylcolchicine 3.

The results obtained after steps a-d are set out in Table 2 below, compared with those of Example 1 and with the results reported in Agric. Biol. Chem., 52(2), 593-594, 1988, relating to the use of β-glucosidase. The kinetic trend of the conversion of colchicoside 2 to 3-O-demethylcolchicine 3 after 24 and 48 hours, and the significant experimental conditions, are reported in particular.

TABLE 2

| Enzyme | Buffer sol. | pH | Temp. | Conc. colchicoside 2 [g/L] | Conc. enzyme [U/mL] | Conc. enzyme [mg/mL] |
| --- | --- | --- | --- | --- | --- | --- |
| β-glucosidase (Agric. Biol. Chem., 52(2), 593-594, 1988) | 50 mM Amm. Ac. | 5.6 | 37° C. | 0.875 | 469 | 16-47 (1) |

TABLE 2-continued

| Enzyme | Buffer sol. | pH | Temp. | Conc. colchicoside 2 [g/L] | Conc. enzyme [U/mL] | Conc. enzyme [mg/mL] |
|---|---|---|---|---|---|---|
| Cellulase CELLULOSIN ®T3 | 50 mM Citrate | 4.8 | 50° C. | 100 | 209 | 50 |
| Cellulase CELLIC ®CTEC2 | 50 mM Citrate | 4.8 | 50° C. | 100 | 5 | 5 |

N.B.: sol. = solution;
conc. = concentration;
temp. = temperature

As stated, the results confirm that the use of cellulase is particularly advantageous, as it allows colchicoside 2 to be quantitatively converted to 3-O-demethylcolchicine 3 in shorter times, using significantly smaller amounts of enzyme.

Example 3

Colchicoside 2 was added to an aqueous citric buffer (0.05M, pH=4.8) at a concentration of 100 g/l; after the addition of each of the enzymes listed in Table 3, at the various enzyme/substrate ratios indicated, the reaction mixture was maintained under stirring at 50° C. for 48 hours. The conversion of colchicoside 2 to 3-O-demethylcolchicine 3 was determined by HPLC analysis (Discovery C18 column, Supelco code 504971, 4.6×250 mm, particle diameter 5 μm, maintained at room temperature, flow rate 1.0 ml/min, injection volume 10 μl, detection wavelength 370 nm; gradient elution, solvent A: 0.005M ammonium acetate, solvent B: tetrahydrofuran: from 5% B to 18% B from 0 to 20 min, from 18% B to 27% B from 20 to 35 min, from 26 to 45 min. 5% B).

TABLE 3

| Enzyme | β-glucosidase activity [U/g] | Enzyme/substrate ratio | Conversion of colchicoside 2 to 3-O-demethylcolchicine 3 after 48 h |
|---|---|---|---|
| β-Glucosidase | 12200 ± 192 | 0.01/1 | 0.2% |
| | | 0.02/1 | 0.5% |
| | | 0.04/1 | 0.7% |
| | | 0.1/1 | 1.4% |
| Cellulase (CELLIC ® CTEC2) | 4080 ± 140 | 0.01/1 | 58.3% |
| | | 0.02/1 | 72.8% |
| | | 0.04/1 | 84.4% |
| | | 0.1/1 | 97.6% |
| Cellulase (CELLIC ® CTEC3) | 10645 ± 179 | 0.01/1 | 98.6% |
| | | 0.02/1 | 99.9% |
| | | 0.04/1 | 100.0% |
| | | 0.1/1 | 100.0% |
| Cellulase | 45 ± 2 | 0.05/1 | 36.7% |
| | | 0.1/1 | 52.4% |
| | | 0.2/1 | 63.8% |
| | | 0.5/1 | 82.3% |
| Cellulase (*Aspergillus niger* cellulase) | 47 ± 1 | 0.05/1 | 18.9% |
| | | 0.1/1 | 31.4% |
| | | 0.2/1 | 56.9% |
| | | 0.5/1 | 63.3% |
| Cellulase (Cellulase 13L.) | 22 ± 2 | 0.05/1 | 52.6% |
| | | 0.1/1 | 50.6% |
| | | 0.2/1 | 78.3% |
| | | 0.5/1 | 86.4% |

Example 4—Measurement of β-glucosidase Activity

Preparation of Samples

The samples (enzymes to be tested) are prepared in a 50 mM phosphate buffer, pH=7, or in any other buffer suitable for the enzyme. The following compounds are known to affect enzyme activity, and should be avoided: reagents containing thiols (—SH), $Ca^{2+}$, $Cu^{2+}$, $Fe^{3+}/Fe^{2+}$, $Hg^{2+}$, $Mg^{2+}$, $Ni^{2+}$, $Th^{2+}$, SDS, Triton™ X-100, TWEEN®, digitonin, EDTA and Tris.

Assay of β-glucosidase Activity

In a 96-well plate, 20 μL of distilled water is transferred into two wells; 200 μL of distilled water is added to one of the two wells, and 200 μL of calibrator to the other.

A master reaction mixture is prepared by combining 200 μL buffer solution at pH=7 and 8 μL p-nitrophenylglucoside substrate; said amounts are sufficient for a single well, and must therefore be multiplied according to the number of enzymes to be tested.

20 μL is added to new wells in the plate, and 200 μL of master reaction mixture is added to them.

The initial absorbance is measured at 405 nm $(A_{405})_{initial}$.

The plate is incubated at 37° C.; after 20 minutes, the final absorbance is measured at 405 nm $(A_{405})_{final}$.

Calculation of β-glucosidase Activity $$\beta\text{-glucosidase activity} == \frac{(A_{405})\text{final} - [(A]405)\text{initial}}{(A405)\text{calibrator} - [(A]405)\text{water}} \times 250 \frac{U}{L}.$$

The invention claimed is:

1. A process for the preparation of colchicine 1 from colchicoside 2 comprising
converting enzymatically colchicoside 2 to 3-O-demethylcolchicine 3, wherein enzymatic conversion is obtained with a cellulase, wherein the cellulase is a mixture of at least two or more enzymes, including at least one of β-glucosidase (EC 3.2.1.21), endo-(1,4)-β-D-glucanase (EC 3.2.1.4) and exo-(1,4)-β-D-glucanase (EC 3.2.1.91).

2. Process according to claim 1, comprising the following steps:
a) adding a buffer solution to colchicoside 2, to provide reaction mixture A;
b) adding a cellulase to reaction mixture A, to provide reaction mixture B;
c) heating reaction mixture B to a temperature ranging between 35° C. and 60° C. and stirring for a time ranging between 24 and 72 hours;
d) isolating 3-O-demethylcolchicine 3 from reaction mixture B;
e) converting 3-O-demethylcolchicine 3 to colchicine 1.

3. Process according to claim 2, wherein the buffer used in step a) is selected from acetate buffer, citrate buffer and phosphate-citrate buffer.

4. Process according to claim 2, wherein the ratio of cellulase to colchicoside 2 (g enzyme/g colchicoside 2 used in step b) ranges between 0.01 and 1.

5. Process according to claim 4, wherein the ratio of cellulase to colchicoside 2 (g enzyme/g colchicoside 2 used in step b) ranges between 0.05 and 0.5.

6. Process according to claim 2, wherein step e) is carried out using an alkylating agent.

7. Process according to claim 2, wherein the conversion of 3-O-demethylcolchicine 3 to colchicine 1 also comprises the following steps:
- f) adding a polar aprotic solvent to 3-O-demethylcholchicine 3, to provide mixture C;
- g) adding a base to reaction mixture C, to provide reaction mixture D;
- h) adding an alkylating agent to reaction mixture D, to provide reaction mixture E;
- i) heating reaction mixture E to a temperature ranging between 40° C. and 80° C. and stirring for a time ranging between 12 and 24 hours;
- j) isolating colchicine 1 from reaction mixture E.

8. Process according to claim 7, wherein the polar aprotic solvent used in step f) is selected from tetrahydrofuran, acetone, acetonitrile, dimethylformamide and dimethylsulphoxide.

9. Process according to claim 7, wherein the base added in step g) is selected from NaOH, KOH, LiOH, $Ba(OH)_2$, $Ca(OH)_2$, $Mg(OH)_2$, $Na_2CO_3$, $K_2CO_3$ and $Cs_2CO_3$.

10. Process according to claim 9, wherein the amount of base ranges between 1 and 5 equivalents relative to of 3-O-demethylcolchicine 3.

11. Process according to claim 7, wherein the amount of alkylating agent added in step h) ranges between 1 and 10 equivalents of 3-O-demethylcolchicine 3.

12. Process according to claim 1, wherein the cellulase possesses β-glucosidase activity greater than or equal to 15 U/g.

* * * * *